(12) United States Patent
Walker

(10) Patent No.: X9442
(45) Date of Patent: Feb. 25, 1836

(54) LEVER POWER, SAWING, &C. , BY

(76) Inventor: Jeremiah Walker

Jeremiah Walker. Phillips. Maine

Letters Patent

The Schedule referred to in these Letters Patent and making part of
the same containing a description in the words of the said Jeremiah Walk
er himself of his improvement in the lever power machine for sawing and
other purposes.

To all to whom these presents shall come. Be it known that I
Jeremiah Walker of Phillips in the County of Somerset and State of Maine
have invented a new and useful machine called a lever power machine for
sawing and other purposes and that the following is a full and exact descrip
tion thereof — In the first place there is a frame about five feet long two
and a half feet wide and two feet high which is constructed of as many
pieces of timber and of such dimension as will render it firm and strong.
near one end of this frame there is a circular saw which is hung upon an
Iron shaft which rests upon the top of the frame and goes quite across it
the saw is placed toward one end of the shaft just within the frame
& toward the other end of the said shaft there is a pulley. The shaft is
kept in its place by iron plates placed over it and screwed down to the
frame. near the other end of the frame there is another iron shaft
running horizontally across the frame like the first. which is kept
in its place by Iron plates screwed to the frame in the same manner
as the one first mentioned. toward one end of this shaft and directly
opposite to the pulley on the saw shaft. there is a large drum
wheel and a flat leather band going around this and the pulley con.
nects them together. this shaft containing the drum wheel is called
the crank shaft. because it is so bent as to make three cranks.
two within the frame a little to the left of the drum and the other
at the end outside the frame. The operation is performed by
means of two levers as follows Viz. one of the levers is long. the other
short with a weight attached to its outer end which extends [illegible]

United States Patent

Patent No.: X9442 a little way from the frame both of these levers at their inner ends are
attached to one of the bottom pieces of the frame below the saw shaft
by means of joints formed of loops and staples. there is also an iron
staple in each of these levers directly under the crank shaft
then two iron rods looped around the two middle cranks at their
upper ends and passing down in a perpendicular direction a
little below the cranks and looped into the staples in the levers
serve to connect the cranks and the levers together. this being done
the drum wheel is started in the direction which it should go
by hand. then the levers commence their up and down motion.
when the outer end of the long lever which is operated by hand is
raised up the short lever containing a weight on its outer end
comes down and each lever carries its own crank along with
it. thus by the simple operation of the long lever the whole ma-
chine is put in motion and by means of the drum and pulley
the circular saw is carried around with great rapidity and
steadiness and answers a valuable purpose in sawing many sorts
of wood and timber. To the third crank which is situated
outside of the frame by the help of suitable gear work there may
be attached a cross cut saw as also sundry implements for boring
[illegible]. When two persons undertake to operate the machine two
long levers are to be used & the weight abovementioned is to
be dispensed with. — Dated at Phillips aforesaid this
3rd day of November Anno Domini 1836.

Witnesses
John Dolby [illegible]
[illegible] Barker

[illegible] Walker

E. L.
Ch. J. W.